Patented Sept. 3, 1946

2,407,041

UNITED STATES PATENT OFFICE 2,407,041

INSECTICIDE

Benjamin H. Thurman, Charlotte, N. C., assignor, by mesne assignments, to Benjamin Clayton, Houston, Tex., doing business as Refining, Unincorporated No Drawing. Application October 10, 1941, Serial No. 414,519

6 Claims. (Cl. 167—15)

This invention relates to insecticides and more particularly to insecticides of the stomach poison type.

One object of the present invention is to provide a new insecticide of the stomach poison type which will adhere to plant foliage and resist washing therefrom by rain while providing an effective poison for insects.

Another object of the invention is to provide an insecticide of the stomach poison type which may be applied in an aqueous medium while resisting washing off by rains.

A further object of the invention is to provide an improved insecticide of the stomach poison type containing phosphatidic material and substantially free of mineral oils but which adheres to plant foliage to provide an effective poison for insects.

The insecticide of the present invention was developed primarily for the control of boll weevil infestations on cotton, although it may be employed for the control of other insect pests which eat plant foliage. The preferred insecticide of the present invention constitutes an aqueous suspension of cottonseed oil phosphatides and an arsenic compound of a polyvalent metal in which the arsenic occurs in the anion with or without an additional stomach poison such as nicotine sulfate. Thus the arsenates and arsenites of polyvalent metals, for example calcium, magnesium, lead, copper, etc., are suitable for employment in the present invention, the arsenates being preferred as they are less likely to cause damage to plant foliage.

For application to cotton plants, cottonseed phosphatides are preferred and best results have been obtained by employing the crude phosphatidic material obtained from crude cottonseed oil by a degumming operation. This crude phosphatidic material contains in addition to phosphatides small quantities of other materials such as resins, gossypol, etc., as well as about 30% of cottonseed oil which functions as a carrier for the phosphatides. This phosphatidic material can be completely dispersed in water by bringing the mixture of phosphatidic material and water to a pH between 5.5 and 7, best results being obtained between 6.0 and 6.7. Adjustment to the correct pH may be accomplished by adding acids or alkalies to the dispersion, weak acids or alkalies being preferably employed, although small amounts of stronger acids and alkalies may be used. After a thorough dispersion of the phosphatides in water has been accomplished, the arsenic compound of a polyvalent metal can be added. In many cases the addition of the arsenic compound will materially change the pH of the solution, but in general the phosphatidic materials stay in dispersion, for example the addition of calcium arsenate which has a pH in aqueous solution of approximately 11.7 may change the pH of the solution to between 11 and 11.6 but the dispersion of the phospatides in the water remains stable. If difficulty is encountered in maintaining a stable dispersion, adjustment of pH towards the range of 5.5 to 7.0 by adding acids or alkalies, may in most cases be carried out so as to maintain the phosphatidic material in dispersion except in cases where the arsenic compound employed tends to decompose when an acid or alkali is added.

The preferred arsenic compound is commercial calcium arsenate which consists of a mixture of mono-, di-, and tri-calcium arsenate. When calcium arsenate is employed alone as the stomach poison the preferred ratio of cottonseed oil phosphatides to calcium arsenate is one part phosphatides to two parts calcium arsenate. Insoluble difficult to disperse precipitates are formed when substantially more phosphatidic material than indicated is employed, although stable mixtures may be produced containing as much as four to eight times as much calcium arsenate as phosphatidic material. With calcium arsenate in the proportions given there is apparently some sort of an intermediate complex formed between the calcium arsenate and the phosphatides which is on the border line of being insoluble and which forms an adhesive compound that disperses in the aqueous medium. It is clear that a calcium lecithinate salt is not formed as such a salt would be insoluble in water and would not go sufficiently into solution to form a stomach poison.

In preparing certain insecticides, for example those for boll weevil control, it has been found advantageous to incorporate other stomach poison such as nicotine sulfate into the composition. When nicotine sulfate is employed in substantial quantities it is found that the ratio of calcium arsenate to phosphatidic material can be reduced materially without forming insoluble precipitates. As a specific example of an insecticide particularly suitable for boll weevil control, a dispersion of ½% crude cottonseed oil phosphatides in water at a pH of 6.7 was prepared. To each 100 gallons of this solution was added 1½ pounds of calcium arsenate and ⅛% of nicotine sulfate. This resulted in a product having substantially the following composition on a weight basis:

| | |
|---|---|
| Water | 99.2 |
| Phosphatidic material containing 30% cottonseed oil as a carrier | .5 |
| Calcium arsenate | .18 |
| 40% nicotine sulfate | .12 |

A light spray of this material was applied to young cotton plants and it remained thereon in effective amounts through several rains, some of which amounted to one or more inches of water. The phosphatidic material apparently formed an effective adhesive as similar plants treated in the conventional manner by dusting powdered calcium arsenate thereon had the calcium arsenate substantially completely washed from the foliage by the first shower. Although the area treated with the insecticide containing phosphatidic material was relatively small and surrounded by untreated areas of similar cotton plants which were severely damaged by boll weevils, even the effect of migration of weevils from the untreated areas was very slight and substantially no damage was caused to the treated area. Since the boll weevil feeds on the cotton boll usually below the surface thereof at least two theories have been advanced for the effectiveness of stomach poisons against boll weevils. One of these theories is that the boll weevils use the dew on cotton plants as a source of water and that the arsenic or other stomach poison applied to the plant dissolves at least partially in the dew to form a stomach poison. It is entirely possible that the water retained in the insecticide containing the phosphatidic material may also form a source of water for the weevil. The other theory holds that the stomach poison is only effective as the insect crawls over the plant foliage and comes in contact with the poison material which is transferred to the mouth of the weevil when the insect cleans itself. If the latter theory is correct it is apparent that the present insecticide because of its adhesive nature is extremely effective.

As a specific example of the employment of calcium arsenate without the nicotine sulfate a dispersion of a .25% crude cottonseed phosphatide was made in water by adjusting the pH of the dispersion to 6.7. Two pounds of calcium arsenate were added to 100 gallons of this dispersion to produce a product having approximately the following composition by weight:

| | |
|---|---|
| Water | 99.25 |
| Cottonseed phosphatides containing 30% crude cottonseed oil | .25 |
| Calcium arsenate | .5 |

This composition was also an effective insecticide for boll weevil control.

It will be apparent that the compositions of the present invention may be made in concentrate form by employing less water, for example one to five parts of water instead of approximately ninety-nine parts water given in the above examples. Such products can then be diluted before use with the appropriate amount of water to provide a spray suitable for application to plant foliage. If such concentrates or final spray compositions are to be stored for any considerable length of time it is preferred to add a small amount of boric acid, for example 1 to 5% on the basis of the phosphatidic material as the boric acid stabilizes the phosphatidic material against fermentation and resulting decomposition. Alternatively the phosphatidic material may be stabilized with 1 to 5% of boric acid before being added to the concentrate or final spray composition.

It will also be apparent that nicotine sulfate can be employed in the phosphatidic composition, either a concentrate or final spray, without the arsenic compounds. As little as ⅛% of nicotine sulfate in a composition containing, for example, ½% phosphatidic material makes an extremely effective spray composition and it will be apparent that the amount of nicotine sulfate can be increased if desired, for example up to 1%. If nicotine sulfate is employed alone it has very little effect upon the pH of the phosphatidic material, but even at a pH of 5.5 to 7 the phosphatidic material provides an effective adhesive resisting washing of the insecticide from the plant foliage by rains.

In addition to its mild effect upon plant foliage, the cheapness and availability, and excellent poisoning effect of calcium arsenate makes it particularly suitable in the present invention. At a pH of 11 to 11.7 it is only slightly soluble in water, which perhaps accounts for its mild effect upon plant foliage, but is sufficiently soluble to be an effective poison. It will be understood, however, that the arsenic compounds of polyvalent metals in which the arsenic occurs in the anion, such as lead arsenate, copper arsensate, magnesium arsenate, etc., may be similarly employed as well as the arsenites of these metals, either for control of boll weevil or other foliage eating insects. Crude cotton phosphatides are also particularly suitable for the present invention, especially for treating cotton plants as these phosphatides appear to be attrahent for the boll weevil, one probable reason being that it is a product of the cotton plant. However, it is possible to employ other phosphatidic material such as corn oil phosphatides, soya bean phosphatides, or compounds of phosphatidic materials with salts of hydroxy organic acids disclosed in my co-pending application Serial No. 311,707, filed December 29, 1939, or compounds of phosphatidic materials with phosphates such as disclosed in my co-pending application Serial No. 311,705, filed December 29, 1939. Most of these phosphatidic materials disperse in water at a pH of 5.5 to 7 but in certain cases it may be necessary to vary the pH of the dispersion in order to get an adequate incorporation of the phosphatidic material into the water. In general, the pH of the initial dispersion of phosphatidic material should have a pH of not less than 5.5 and the pH of the final composition containing arsenic compound will not be less than 7.

No organic solvents or mineral oils are necessary or desirable in insecticides of the present invention as they serve no useful purpose and have a deleterious effect upon the composition. Although the insecticides of the present invention are applied in an aqueous medium they adhere tenaciously to the plant foliage, even though subjected to repeated rains. Also the phosphatidic material acts as agent for stabilizing the stomach poisons against decomposition and loss of potency. For example it is known that calcium arsenate rather rapidly loses its toxicity upon exposure to air. The phosphatidic material apparently inhibits contact between the air and the arsenic compound to prevent such loss of toxicity. The phosphatidic material also prevents loss of water soluble stomach poisons such as nicotine sulfate by preventing rain from washing the nicotine sulfate from the plant foliage. It will thus be apparent that I have provided an improved insecticide composition.

This application is a continuation-in-part of my co-pending application Serial No. 332,111, filed April 27, 1940.

While I have disclosed the preferred embodiments of my invention it is understood that the details thereof may be varied within the scope of the following claims:

I claim:

1. An insecticide of the stomach poison type consisting essentially of an aqueous dispersion of a crude vegetable oil phosphatide and a stomach poison comprising a finely divided slightly water soluble compound selected from the group consisting of arsenates and arsenites of polyvalent metals, the proportions of phosphatide and polyvalent metal compound ranging between approximately 1 part phosphatide and 2 to 8 parts polyvalent metal compound.

2. An insecticide of the stomach poison type consisting essentially of an aqueous dispersion of a crude vegetable oil phosphatide and a stomach poison comprising finely divided slightly water soluble calcium arsenate, the proportions of phosphatide and calcium arsenate ranging between approximately 1 part phosphatide and 2 to 8 parts calcium arsenate by weight.

3. An insecticide of the stomach poison type consisting essentially of an aqueous dispersion of crude cottonseed oil phosphatide and a stomach poison comprising finely divided slightly water soluble calcium arsenate, the proportions of phosphatide and calcium arsenate ranging between approximately 1 part phosphatide and 2 to 8 parts calcium arsenate by weight.

4. An insecticide as defined in claim 1 in which the stomach poison also comprises a substantial amount of nicotine sulfate.

5. An insecticide as defined in claim 3 in which the stomach poison also comprises a substantial amount of nicotine sulfate.

6. An insecticide of the stomach poison type consisting essentially of an aqueous dispersion of crude cottonseed oil phosphatide and a stomach poison comprising nicotine sulfate and finely divided slightly soluble calcium arsenate, the proportions of phosphatide, nicotine and calcium arsenate ranging between approximately 1 part phosphatide and ¼ to 2 parts nicotine sulfate and ½ to 8 parts calcium arsenate.

BENJAMIN H. THURMAN.